(12) United States Patent
Burkhardt et al.

(10) Patent No.: US 8,274,274 B2
(45) Date of Patent: Sep. 25, 2012

(54) POSITION/DISPLACEMENT MEASURING SYSTEM

(75) Inventors: Thomas Burkhardt, Zell (DE); Achim Zern, Heilbronn (DE)

(73) Assignee: Balluff GmbH, Neuhausen (DE)

( * ) Notice: Subject to any disclaimer, the term of this patent is extended or adjusted under 35 U.S.C. 154(b) by 401 days.

(21) Appl. No.: 12/661,416

(22) Filed: Mar. 15, 2010

(65) Prior Publication Data

US 2010/0244815 A1    Sep. 30, 2010

(30) Foreign Application Priority Data

Mar. 31, 2009    (DE) .......................... 10 2009 016 663

(51) Int. Cl.
*G01R 33/00*    (2006.01)

(52) U.S. Cl. .................................. 324/207.11

(58) Field of Classification Search ........................ None
See application file for complete search history.

(56) References Cited

U.S. PATENT DOCUMENTS

| | | | |
|---|---|---|---|
| 5,279,044 A | 1/1994 | Bremer | |
| 6,545,262 B1 | 4/2003 | Burgschat | |
| 6,813,844 B1 | 11/2004 | Steinich | |
| 7,503,231 B2 * | 3/2009 | Shoji | 324/207.25 |
| 8,179,129 B2 * | 5/2012 | Burkhardt et al. | 324/207.25 |
| 2002/0021450 A1 * | 2/2002 | Aoki | 356/499 |
| 2004/0174161 A1 | 9/2004 | Tausch et al. | |
| 2005/0060905 A1 | 3/2005 | Novak et al. | |
| 2007/0074416 A1 | 4/2007 | Reusing | |

(Continued)

FOREIGN PATENT DOCUMENTS

DE    1 930 976    12/1970

(Continued)

OTHER PUBLICATIONS

"Lineare Weg-und Abstandssensoren" (Linear Displacement and Distance Sensors), Thomas Burkhardt, Albert Feinäugle, Sorin Fericean, Alexander Forkl, Verlag moderne Industrie, Die Bibliothek der Technik, vol. 271, Munich 2004, chapter "Wegsensoren mit magnetisch kodiertem Maßkörper", pp. 67-76.

*Primary Examiner* — Jermele M Hollington
(74) *Attorney, Agent, or Firm* — Lipsitz & McAllister, LLC (57) ABSTRACT

A position/displacement measuring system is provided comprising at least one magnetically encoded scale body with at least one encoding track and a sensor device with at least one sensor sensitive to the encoding, the at least one encoding track comprising main fields of at least a first type and a second type which are arranged in a periodically alternating manner in at least a first direction, the subfields of the first type and second type being north pole fields and south pole fields, wherein the main fields of the first type and the main fields of the second type are each subdivided into subfields of at least two different types; wherein a length and/or an encoding strength of the subfields within a main field varies in at least the first direction; and wherein, in the main fields of the first type, the total length in the first direction and/or the total surface of field portions of the first type is greater than the total length and/or the total surface of field portions which are not of the first type, and in the main fields of the second type, the total length in the first direction and/or the total surface of field portions of the second type is greater than the total length and/or the total surface of field portions which are not of the second type.

19 Claims, 5 Drawing Sheets

U.S. PATENT DOCUMENTS

| | | | |
|---|---|---|---|
| 2008/0061771 A1 | 3/2008 | Sugiyama et al. | |
| 2009/0271998 A1 | 11/2009 | Carlen et al. | |
| 2010/0102804 A1 | 4/2010 | Burkhardt et al. | |
| 2010/0219811 A1* | 9/2010 | Bauch et al. | 324/207.13 |
| 2011/0101964 A1* | 5/2011 | Ausserlechner et al. | 324/207.11 |
| 2011/0193552 A1* | 8/2011 | Fulkerson et al. | 324/207.25 |

FOREIGN PATENT DOCUMENTS

| | | |
|---|---|---|
| DE | 692 22 072 | 3/1998 |
| DE | 100 28 136 | 12/2000 |
| DE | 100 52 086 | 1/2002 |
| DE | 102 10 326 | 9/2003 |
| DE | 10 2005 039 280 | 2/2007 |
| DE | 10 2005 055 905 | 5/2007 |
| DE | 10 2006 010 161 | 8/2007 |
| DE | 10 2007 008 870 | 9/2008 |
| DE | 10 2008 055 680 | 4/2010 |
| EP | 2236990 A2 * | 10/2010 |
| GB | 1 319 531 | 6/1973 |

* cited by examiner

POSITION/DISPLACEMENT MEASURING SYSTEM

This application claims the benefit of German Patent Application No. 10 2009 016 663.7 filed on Mar. 31, 2009.

The present disclosure relates to the subject matter disclosed in German application No. 10 2009 016 663.7 of Mar. 31, 2009, which is incorporated herein by reference in its entirety and for all purposes.

BACKGROUND OF THE INVENTION

The invention relates to a position/displacement measuring system comprising at least one magnetically encoded scale body with at least one encoding track and a sensor device with at least one sensor sensitive to the encoding, the at least one encoding track comprising main fields of at least a first type and a second type which are arranged in a periodically alternating manner in at least a first direction.

Displacement sensors with magnetically encoded scale body are described in the book "Lineare Weg-und Abstandssensoren" (Linear Displacement and Distance Sensors) by T. Burkhardt, A. Feinäugle, S. Fericean and A. Forkl, Verlag Moderne Industrie, Bibliothek der Technik, Volume 271, Munich 2004.

In the German Patent Application No. 10 2008 055 680.7 of Oct. 28, 2008/U.S. application Ser. No. 12/589,509 of Oct. 23, 2009, not prepublished now U.S. Pat. No. 8,179,129, of the same applicant, there is described a position/displacement measuring system comprising a sensor head and an encoded scale body. The scale body extends in a first direction and in a second direction lying transversely to the first direction. It comprises an absolute position determination region and an incremental position determination region with an encoding in the first direction. The absolute position determination region comprises an encoding in the second direction. The sensor head comprises a first sensor device with a sensor resolution parallel to the first direction, which is associated with the incremental position determination region. Further, it comprises a second sensor device with a sensor resolution in the second direction, which is associated with the absolute position determination region.

SUMMARY OF THE INVENTION

In accordance with an embodiment of the invention, there is provided a position/displacement measuring system which gives a minimized harmonic content.

In accordance with an embodiment of the invention, the main fields of the first type and the main fields of the second type are each subdivided into subfields of at least two different types, the subfields of the first type and second type being north pole fields and south pole fields; a length and/or an encoding strength of the subfields within a main field varies in at least the first direction; and in the main fields of the first type, the total length in the first direction and/or the total surface of field portions of the first type is greater than the total length and/or the total surface of field portions which are not of the first type, and in the main fields of the second type, the total length in the first direction and/or the total surface of field portions of the second type is greater than the total length and/or the total surface of field portions which are not of the second type.

In the solution in accordance with the invention, the main fields, which are of the first type or second type in terms of their arithmetic means or surface integrals over the subfield distribution, are subdivided into subfields. A reduction of harmonics can be achieved for the sensor device by a subdivision into the subfields which is selected in a defined manner and, in particular, by a stochastic or periodic modulation.

For example, it has been shown that in magnetically encoded scale bodies, if the sensor device is positioned at a relatively small distance (small air gap) above the scale body, the effective field pattern for the sensor device deviates greatly from a sinusoidal field pattern. The harmonics resulting therefrom for the sensor device can, in particular at large pole widths (length of the main fields in the first direction), no longer be compensated for by an evaluation device. In the solution in accordance with the invention, providing subfields of different types (at least two types) within a main field results in a minimization of harmonics already taking place when the field is being formed.

In a position/displacement measuring system with a magnetically encoded scale body, it is thereby possible, in particular, to position the sensor device at a small distance from the scale body, i.e., to provide a small air gap of, for example, less than 4 mm. Even at such a small distance, the result is a signal with low non-linearity. The signal strength is very high due to the high field amplitude at small air gap, resulting in a high signal-to-noise ratio. It is thereby possible to implement a magnetic position/displacement measuring system which has a high signal-to-noise ratio, low non-linearity, and optimized hysteresis. At correspondingly large pole widths of the main fields, even large distances (large gaps) can be implemented.

The variation of the length of the subfields can be in one or more directions. For example, there is provided a variation in a measuring direction and, optionally, additionally in a direction transverse to the measuring direction (widthwise direction).

For example, in the case of a magnetic encoding, a different encoding strength can be attained via complete and partial magnetization. With complete magnetization, for example, a north pole field has a strength of 30 mT, a south pole field has a strength of −30 mT (a neutral field has a magnetic field strength of 0 mT). By partial magnetization, for example, a field having a magnetic field strength of 10 mT can be produced.

In principle, the subfields of a main field comprise at least two different types from among the following types: first type, second type, and third or further type. This enables a corresponding effective field adjustment of the biasing field of the encoded scale body for the sensor device.

The at least one encoding track has an extension in the first direction and in a second direction transverse to the first direction, and the sensor device is positioned spaced from the at least one scale body in a third direction which is transverse to the first direction and transverse to the second direction. The relative position of the sensor device with respect to the encoded scale body can thereby be determined in a simple manner.

In particular, the first direction is a measuring direction for the relative position and/or the displacement or movement of the sensor device with respect to the at least one scale body. It can be provided for a variation in the subfields to be in the measuring direction only or in both the measuring direction and the second direction transverse to the measuring direction. A finer subdivision can thereby be also achieved in the second direction in order to increase the measuring accuracy.

In principle, the at least one encoding track is formed as an incremental position determination region.

An additional absolute position determination region can be provided. It is possible to determine absolute positions if the at least one encoding track is located on the incremental position determination region and a calibration run is carried out to a reference position.

In the above mentioned non-prepublished German Patent Application, there is described a position/displacement measuring system which comprises an absolute position determination region. Such a region can additionally be provided in the solution in accordance with the invention.

It is particularly advantageous if the variation in the subfields of the main fields is selected such that an effective sensor-biasing field pattern of the at least one encoding track is minimized in respect of harmonics and, in particular, sinusoidal in shape. This results in low non-linearity so that the relative position of the sensor device with respect to the encoded scale body can be determined with high accuracy.

It is particularly advantageous if the variation in the subfields of the main fields is periodic with the period of the arrangement of the main fields, or stochastic. A minimization of harmonics can thereby be achieved in a simple manner. In particular, there is a variation in the form of a pulse width modulation. Alternatively, it is also possible for the subfields to be stochastically distributed within the main fields in order to achieve a reduction of harmonics.

For the same reason, it is advantageous if the variation in the subfields is periodically modulated.

Advantageously, the variation in the subfields is a sampling ratio variation, which means that the sampling ratio of different subfields is varied in order to obtain a reduction in harmonics.

In particular, the varied sampling ratio is sinusoidal in order to obtain a minimization of harmonics.

In an exemplary embodiment that is advantageous in terms of manufacture, the varying sampling ratio is or comprises a variation of the length in at least the first direction of subfields. A periodic modulation can thereby be obtained in a simple manner. By different dimensions of different subfields, an optimized field configuration is obtained.

The variation, for example, is a variation of the ratio of the length in at least the first direction of next or next-but-one neighboured subfields of different types. A periodic modulation can thereby be obtained in a simple manner.

In an exemplary embodiment, subfields of different types are arranged alternately in at least the first direction, with pairs of subfields of different types being arranged successively, and the pairs having the same length in at least the first direction, and the ratio of the lengths varying in at least the first direction for different pairs. A periodic modulation in the form of a pulse width modulation can thereby be attained in a simple manner.

In particular, the ratio of the lengths is sinusoidal, i.e., the ratios of the lengths for different pairs have, as an envelope or surface integral, a sine curve.

It is alternatively or additionally possible for the varying sampling ratio to be or to comprise a variation of the encoding strength. In a magnetically encoded scale body, such a varying encoding strength can be achieved, for example, by a varying magnetization strength.

In particular, subfields of the third type are fields that are neutral to the encoding. For example, in magnetically encoded scale bodies, such third fields are magnetically neutral, i.e., non-magnetized regions. In a capacitively encoded scale body, such subfields of the third type are electrically neutral regions.

It is possible for a variation with respect to length and/or encoding strength of subfields to be additionally provided in a second direction transverse to the first direction, i.e., for a periodic modulation to be also provided in the second direction.

In a preferred exemplary embodiment, the at least one encoding track is magnetically encoded, and the main fields of the first type and second type are north pole fields and south pole fields, and the subfields of the first type and second type are north pole fields and south pole fields. In a corresponding magnetic position/displacement measuring system, low non-linearity with high signal-to-noise ratio and optimized hysteresis can be achieved. A sensor device can also be positioned at a small air gap to the scale body, and the correspondingly high field biasing results in a high signal-to-noise ratio, or low harmonic content if the subfields are of sufficiently small extent.

There can be provided subfields of the third type, which are magnetically neutral fields.

In a magnetically encoded scale body, the main fields of the first type and second type, integrated over their surfaces, are north pole fields and south pole fields, the main fields of the first type and second type not being homogeneous north pole fields and south pole fields but integrally acting as such. The total length of field portions of the same type outweighs the total length of field portions of other types in at least the first direction. (If no field of the north pole type and south pole type predominates, the total field strength for a main field turns into zero; zero-crossing is desirable in certain areas.)

The following description of preferred embodiments serves in conjunction with the drawings to explain the invention in greater detail.

DETAILED DESCRIPTION OF THE INVENTION

Figure 1:
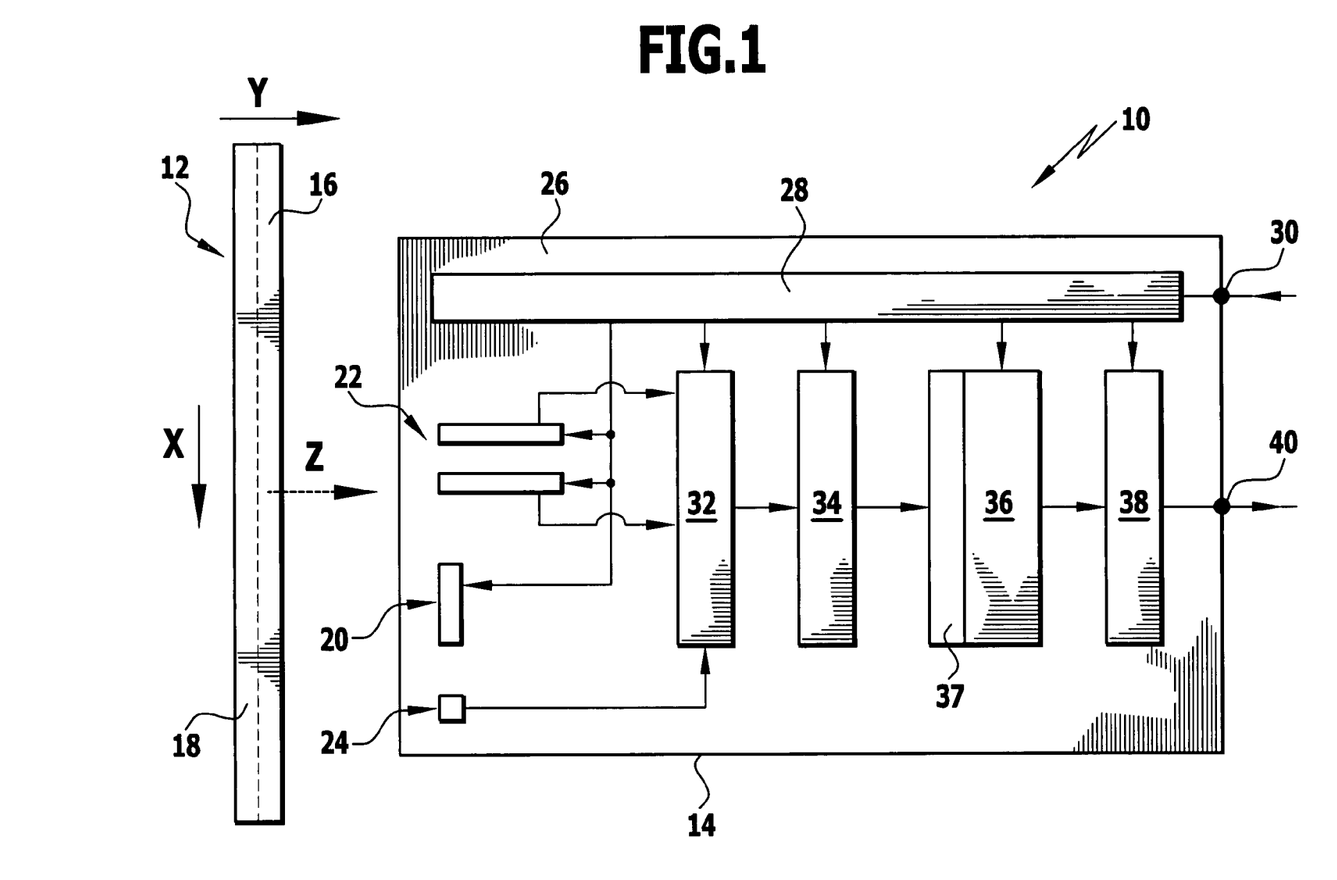
FIG. 1 shows a schematic representation of an embodiment of a position/displacement measuring system in accordance with the invention with a scale body and a sensor head.

An embodiment of a position/displacement measuring system in accordance with the invention, which is shown schematically in FIG. 1 and indicated therein by 10, comprises an encoded scale body 12. In the described embodiment, the scale body 12 is magnetically encoded. The scale body 12 itself comprises a support on which the magnetic encoding is arranged. The magnetic encoding is formed, for example, by a plastic band (tape) which is flexible and magnetizable. The encoding of the scale body 12 is made by a corresponding alternating arrangement of pole fields of the north pole type and pole fields of the south pole type.

The magnetic field lines of these pole fields form a three-dimensional vector field. A sensor head 14 is arranged, in particular movably, in this field.

The scale body 12 extends in a first direction X and in a second direction Y, which is transverse and, in particular, perpendicular, to the first direction X. The first direction X is a measuring direction in which the position or the displacement (movement) of the sensor head 14 relative to the scale body 12 can be determined. The sensor head 14 is spaced from the scale body 12 in a third direction Z, the third direction being transverse and, in particular, perpendicular to the first direction X and transverse and, in particular, perpendicular to the second direction Y. There is an air gap between the sensor head 14 and the scale body 12. The pole fields have a normal direction parallel to the third direction Z.

As will be explained in greater detail hereinbelow, the scale body 12 comprises (at least) one encoding track 15 as an incremental position determination region 16, which is correspondingly magnetically encoded.

There can be provided a further encoding track as an absolute position determination region 18. With respect to position/displacement measuring systems comprising an incremental position determination region and an absolute position determination region, reference is made to the non-prepublished German Patent Application No. 10 2008 055 680.7 of Oct. 28, 2008/U.S. application Ser. No. 12/589,509 of Oct. 23, 2009, of the same applicant, which are incorporated herein and made a part hereof by reference.

The sensor head 14 comprises a plurality of sensors. In the solution in accordance with the invention, the sensor head 14 comprises a first sensor device 20 with one or more sensors, which have a magnetic field resolution in the first direction X. The first sensor device 20 is associated with the incremental position determination region 16.

The sensor head 14 optionally further comprises a second sensor device 22 with one or more sensors, which have a magnetic field resolution in the second direction Y. The second sensor device 22 is associated with the absolute position determination region 18.

A third sensor device 24 can be provided, which has a magnetic field resolution in the third direction Z. For example, tiltings of the sensor head 14 relative to the scale body 12 can be detected by the third sensor device 24.

The sensor devices 20, 22, 24 are arranged in a housing 26. A power supply device 28 for the sensor devices 20, 22, 24 is positioned in the housing 26. Associated with the power supply device 28 are one or more external connections 30 for an external power supply. A power source arranged on the sensor head 14 or a receiving device for a wireless power supply can also be optionally associated with the power supply device 28.

The sensor devices 20, 22, 24 are followed by an amplifier 32, which is also positioned in the housing 26. The sensor devices 20, 22, 24 provide their signals to the amplifier 32, in which they are amplified.

It is also possible for the amplifier 32 to be followed by an analog/digital converter, which converts analog signals of the sensor devices to digital signals.

It is, in principle, also possible for one or more sensor devices to already provide digital signals. In this case, no analog/digital converter 34 is required.

The amplified and, optionally, converted signals are provided to an evaluation device 36. In particular, this is formed by a microcontroller (or ASIC or DSP, etc.). It can also comprise an interpolator 37.

The evaluation device 36 provides the corresponding signals to a signal conditioning device 38, with these signals being tappable at an output 40 of the sensor head 14. There can be wireless signal transmission or line transmission of corresponding evaluation signals.

The sensor devices comprise one or more magnetic-field sensitive sensors. For example, the first sensor device comprises an analog magnetic-field sensitive displacement/position sensor, which has a corresponding resolution in the first direction X. In an exemplary embodiment, this first sensor device 20 comprises a first magnetic field sensor and a second magnetic field sensor, which output signals phase-shifted through 90°. Such magnetic field sensors are also referred to as sine sensors or cosine sensors.

Figure 2A:
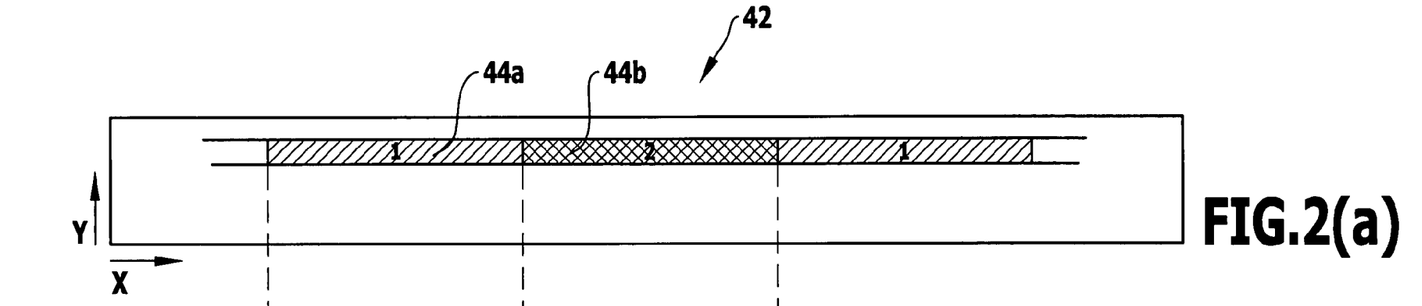
FIG. 2(a) shows, in top view, a partial representation of an exemplary embodiment of a scale body known in the art.

In an embodiment known in the art, which is schematically represented in FIG. 2(a), an encoding track 42 comprises a plurality of main fields of a first type 44a and a second type 44b. These main fields 44a and 44b are arranged in a periodically alternating manner with a longitudinal extension in the direction X. The main field of the type 44a is, for example, a north pole field, and a main field of the second type 44b is a south pole field. Accordingly, north pole fields and south pole fields succeed one another in a periodically alternating manner in the direction X. The main fields 44a and 44b all have the same length in the direction X. They have a longitudinal extension and, in particular, the same width in the second direction Y.

Such an encoding track 42 can be implemented by having a magnetization existing in the longitudinal (X-)direction or by having a magnetization existing in the third direction Z (which is perpendicular to the drawing plane in FIG. 2(a)).

Figure 2B:
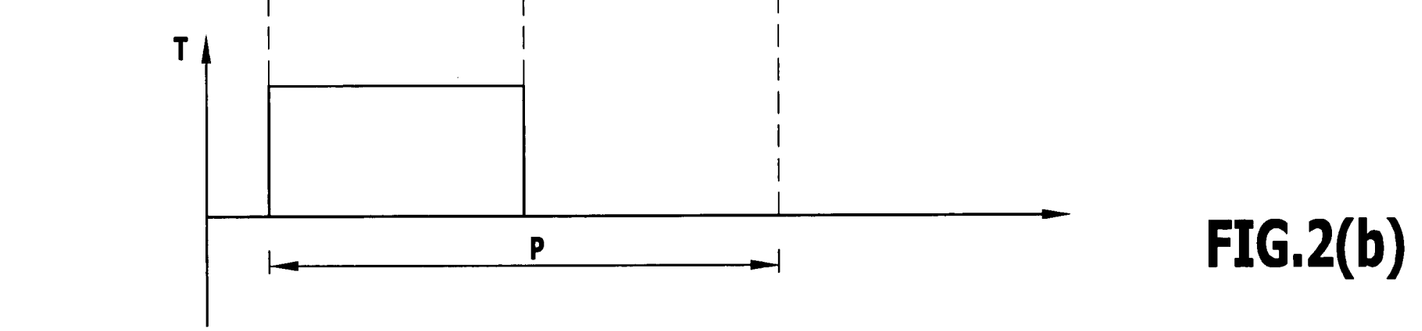
FIG. 2(b) shows the encoding pattern for the scale body in accordance with FIG. 2(a) along the direction X.

Within the main fields of the first type 44a and the second type 44b, the magnetization is uniform, i.e., homogeneous, across the whole surface of the corresponding main field. This is indicated in FIG. 2(b) by a sampling ratio T. The sampling ratio T characterizes the ratio. The sampling ratio T is defined as the proportion of length of field portions of the first type within the corresponding main fields. This sampling ratio T is a periodic rectangular function with the period P of the arrangement of the main fields of the first type 44a and the second type 44b. The main field of the first type 44a exclusively consists of a pole field of the first type, and the main field 44b exclusively consists of a pole field of the second type.

Particularly with magnetically encoded scale bodies, there is the basic problem that at a small distance of the sensor head 14 in the third direction Z (at a small air gap), the resulting magnetic field of the scale body 12 deviates from the ideally sinusoidal pattern in the direction X and, for example, is nearer to a rectangular pattern. This is aggravated when large pole widths (lengths of the main fields in the first direction X) are present. As a consequence, the x component of the magnetic field along the direction X and the z component of the magnetic field in the direction X deviate greatly from the ideal sine pattern. By increasing the distance in the Z direction, the harmonic content can be reduced, i.e., the pattern becomes more "sinusoidal".

The evaluation device 36 with a corresponding interpolator usually assumes that the magnetic field of the scale body has an ideal, sinusoidal pattern. At small pole widths (length in the direction X), a harmonic reduction can be achieved by the sensor device. A simple reduction of harmonics is, however, no longer possible if the pole widths are greater than, for example, a corresponding sensor chip width of the sensor device.

Figure 3A:
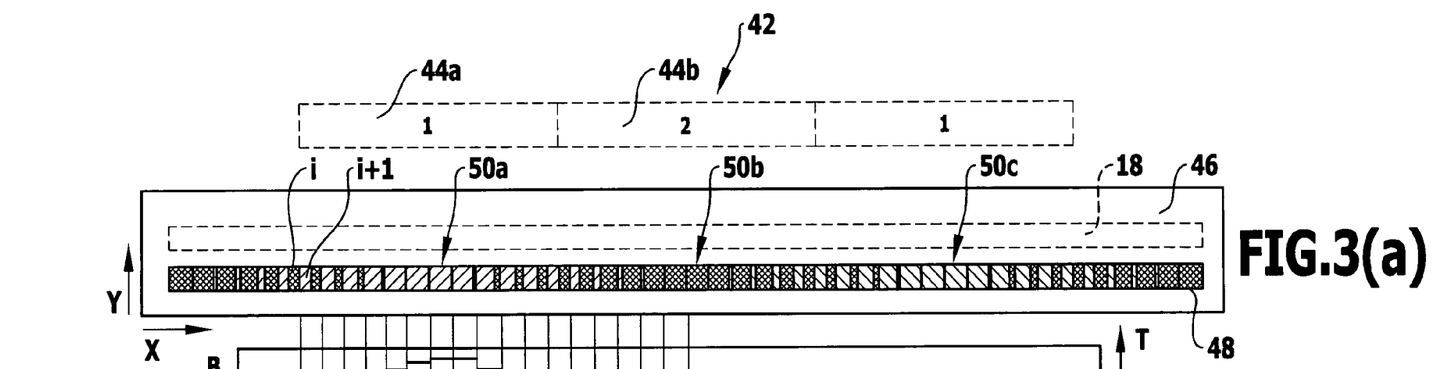
FIG. 3(a) shows, in top view, a schematic representation of an exemplary embodiment of a scale body in accordance with the invention.

An exemplary embodiment of a position/displacement measuring system in accordance with the invention comprises a scale body 46 (FIG. 3(a)) with an encoding track 48. This encoding track 48 is formed as an incremental position determination region. Optionally, an absolute position determination region 18 can be arranged as a further encoding track beside the encoding track 48. The encoding track 48 comprises a plurality of main fields 50a, 50b, 50c, etc., which are arranged in succession next to one another in the direction X. The main fields 50a, 50b, etc., are arranged alternately periodically next to each other with a period P (see FIG. 3(b)).

The main fields are of the first type and second type. For example, the main field 50a is of the first type, and the main field 50b is of the second type. The main fields of the first type 50a and of the second type 50b are arranged in a periodically alternating manner, i.e., the neighbouring fields of a main field of the first type are main fields of the second type, and the neighbouring fields of a main field of the second type are main fields of the first type.

The main fields 50a, 50b are not formed homogeneously but are subdivided into subfields i. A main field 50a of the first type is of the first type with respect to its surface integral, and a main field of the second type 50b is of the second type with respect to its surface integral.

In FIG. 3(a), main fields 44a, 44b as are known in the art are shown for comparison.

The subfields i within a main field 50a or 50b are of different types. In an exemplary embodiment (which is shown in FIG. 3(a)), a main field of the first type 50a is subdivided into subfields i of the first type and second type. A main field of the second type 50b is subdivided into subfields i of the first type and second type. This means that a main field of the first type also contains subfields of the second type, and a main field of the second type also contains subfields of the first type.

The subfields within a main field 50a or 50b are formed and distributed in a defined manner in order to reductively optimize with respect to harmonics the field pattern of the magnetic field for the sensor head 14 and, in particular, to obtain a sinusoidal pattern even for small distances of the sensor head 14 to the scale body 46. To this end, there is provided a periodic modulation for the formation and arrangement of the subfields i within the main fields 50a, 50b. The period of this periodic modulation is the period P of the arrangement of the main fields 50a, 50b.

Figure 4:
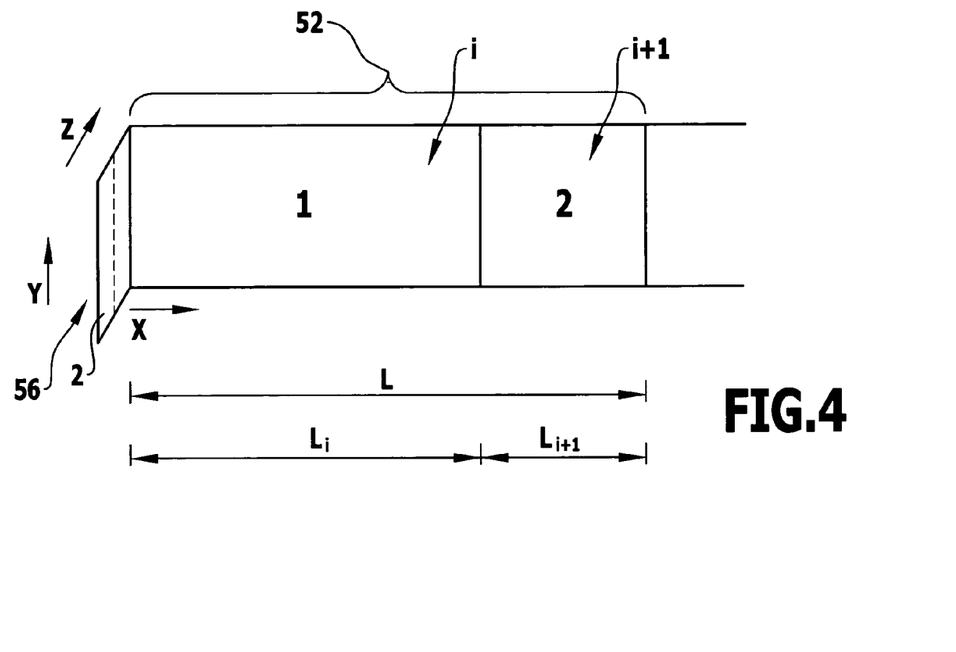
FIG. 4 shows a partial representation of subfields of the scale body in accordance with FIG. 3(a)

Subfields i have a length $L_i$ in the direction X (FIG. 4). Adjacent subfields i, i+1 form a pair {i, i+1}, where i is, for example, odd. Such pairs 52 of subfields i, i+1 have the same length L in the first direction X. A main field of the first type 50a and a main field of the second type 50b are subdivided along the direction X into these corresponding pairs 52 of equal lengths L. A pair 52, in turn, is subdivided into two subfields i, i+1. The sampling ratio $L_i/L_{i+1}$ of different pairs 52 {i, i+1} varies in order to reduce harmonics. This ratio is sinusoidal:

$$T = L_i / L_{i+1} = \sin\left(\frac{2\pi X_i}{P}\right)$$

with $X_i$ being the locus of the pair {i, i+1} along the first direction X.

This modulation of the sampling ratio corresponds to a pulse width modulation.

In a main field of the first type 50a, a pair 52 of subfields i, i−1 always contains a subfield of the first type, with a subfield of the second type being capable of being reduced to zero length. In the main field 50b of the second type, each pair 52 contains a subfield of the second type of finite length, with a subfield of the first type being capable of being reduced to zero length in a pair 52. For a main field of a certain type, the sampling ratio T according to the above formula is selected such that the field i+1 is of the certain type.

Figure 3B:
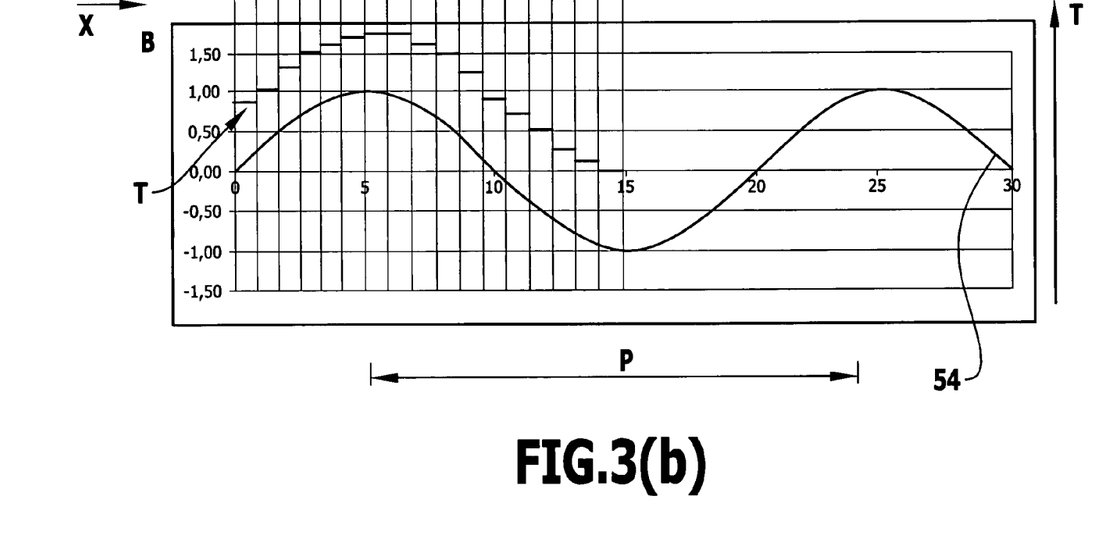
FIG. 3(b) shows the encoding pattern (T) for the scale body in accordance with FIG. 3(a) in the direction X and the resulting magnetic field pattern (if the scale body is magnetically encoded)

FIG. 3(b) shows the pattern of the sampling ratio T along the direction X. This sampling ratio modulation with period P causes an effective field pattern for the sensor head 14, which is reduced in harmonics and, in particular, sinusoidal in shape (FIG. 3(b), reference numeral 54). This results in a sinusoidal field pattern 54 for the corresponding magnetic field components, in particular $B_Z$ and $B_X$, along the first direction X even for small distances of the sensor head 14 to the scale body 46 in the third direction Z, i.e., for small air gaps. A corresponding pattern minimized in harmonics can, for example, already be attained for air gaps (distances) of the order of 0.1 mm. This, in turn, means that the amplitude of the corresponding field for the sensor head 14 is very high, due to a small distance, so that a high signal strength results. A high signal strength with minimized non-linearity is thereby obtained even for small air gaps.

The solution in accordance with the invention enables positions or displacements of the sensor head 14 relative to the scale body 46 to be measured with high accuracy even if the distance between the sensor head 14 and the scale body 46 in the third direction Z is relatively small and, in particular, less than 4 mm.

A typical period P is 2 cm or 4 cm.

In an embodiment, as indicated in FIG. 4, the subfields i are produced by magnets 56 magnetized in the third direction Z, i.e., north poles and south poles of these magnets 56 succeed each other in the third direction Z, with corresponding north pole fields and south pole fields of these magnets 56 having an extension in the first direction X and in the second direction Y. It is also possible to implement a corresponding pole distribution by magnetizing the surface of the scale body.

The pole field biasing the sensor head 14 is the one that lies at the surface, i.e., the one closest to the sensor head 14 in the third direction Z. In addition, the magnetic fields in X direction and Z direction can be evaluated in the sensor head 14.

In the solution in accordance with the invention, the main fields of the first type 50a and of the second type 50b are divided into subfields i, in which there is a variation with period P of the arrangement of the main fields. In particular, there is a periodic modulation in order to reduce harmonics for the sensor device 20.

In particular, the variation in the subfields is a sampling ratio variation of next-neighboured subfields i, i+1.

It is, in principle, possible that for this variation not only next-neighboured subfields be used but also next-but-one neighboured subfields or subfields that are spaced apart further.

In the above described exemplary embodiment with the variation in the direction X, the main field 50a, when viewed as a surface integral, is of the first type. However, it comprises subfields of the second type, with the total length of the subfields of the first type in the first direction X predominating over the total length of the subfields of the second type in this direction. These conditions are correspondingly reversed for the main fields 50b. It is, for example, provided that each individual pole field (subfield) has the same magnetization strength and that the magnetization strength differs only in sign. The variation is achieved solely by the corresponding surface subdivision.

Alternatively, or additionally, it is also possible for the encoding strength to be correspondingly periodically modulated, that is, for the magnetization strength to be varied. This is another means by which a reduction in harmonics can be achieved or assisted.

In a periodic distribution of subfields, it is of particular importance for the period to conform to the period of the main fields in order to obtain a reduction in harmonics. A reduction in harmonics is also possible if subfields are arranged in a purely stochastically distributed manner in the main fields.

Figure 5:
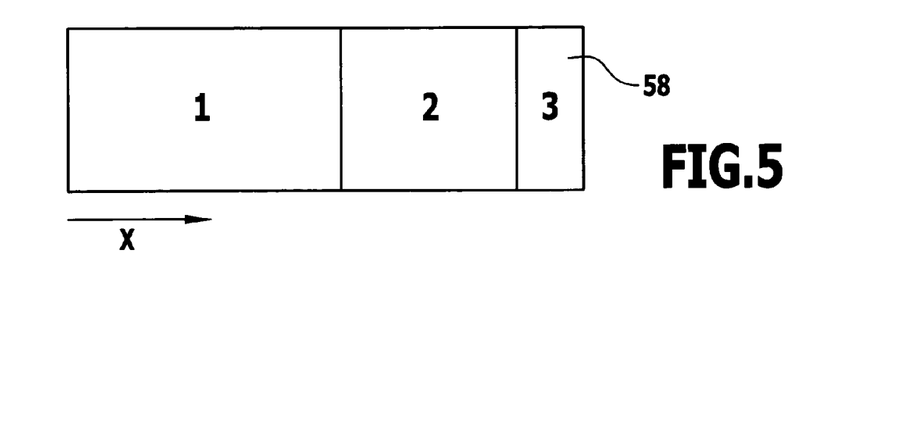
FIG. 5 shows a further schematic representation of subfields.

It can, in principle, also be provided for the harmonics reduction to be achieved using subfields of a third type 58 (FIG. 5), with subfields of the third type 58 being magnetically neutral, i.e., not magnetized. It is, for example, possible for subfields of the third type 58 in combination with subfields of the first type to be included in a main field of the first type 50a. Optionally, subfields of the second type can additionally be included. Correspondingly, subfields of the second type in combination with subfields of the third type 58 can be included in main fields of the second type 50b, and, optionally, subfields of the first type can additionally be included. A reduction in harmonics can be achieved, as described above, by a corresponding periodic modulation.

Figure 6:
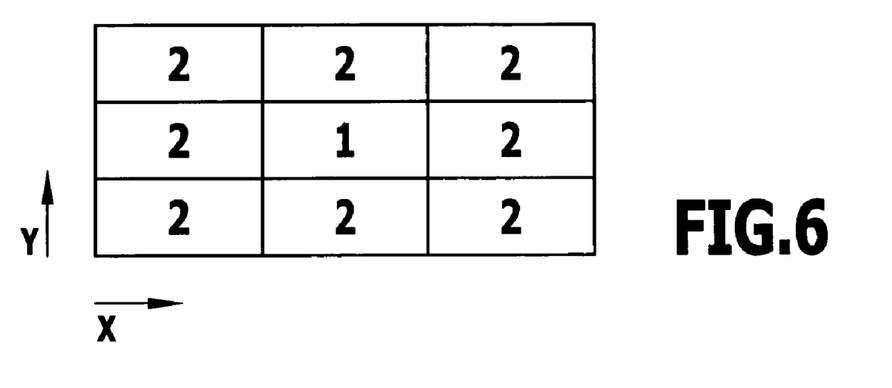
FIG. 6 shows a detail of a further exemplary embodiment of a scale body in accordance with the invention.
Figure 7:
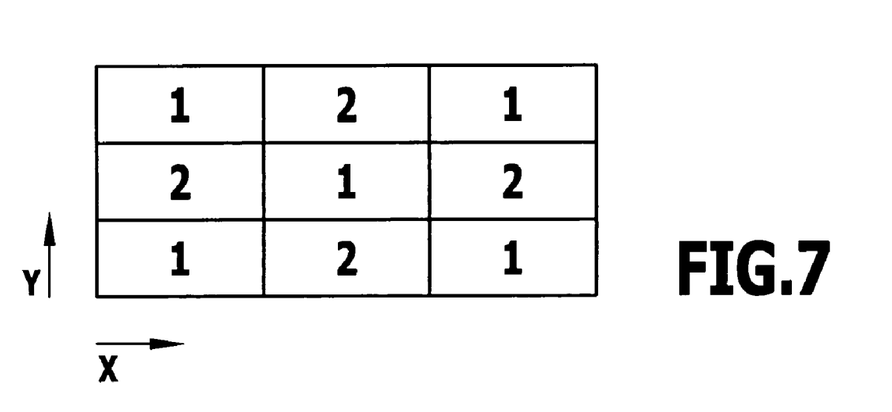
FIG. 7 shows a detail of a further exemplary embodiment of a scale body in accordance with the invention.

It is also possible, as indicated in FIGS. 6 and 7, that a variation in the subfields is made not only along the first direction X, but is also provided along the second direction Y. A finer subdivision for influencing, in particular minimizing, harmonics can thereby be achieved in the direction Y.

The encoded-scale body has been described above with reference to the exemplary embodiment of a magnetically encoded scale body in which the subfields i are north pole fields and south pole fields and the main fields are, correspondingly, north pole fields and south pole fields.

The solution in accordance with the invention can provide position/displacement measuring systems, and, in particular, magnetic position/displacement measuring systems with magnetically encoded scale bodies that have reduced non-linearities at large pole widths even at a small distance and, in particular, at a small air gap, to a sensor head, and that have a high signal-to-noise ratio due to higher achievable magnetic field strengths when biasing the sensor.

The invention claimed is:

1. Position/displacement measuring system comprising:
at least one magnetically encoded scale body with at least one encoding track; and
a sensor device with at least one sensor sensitive to the encoding;
wherein the at least one encoding track comprises main fields of at least a first type and a second type which are arranged in a periodically alternating manner in at least a first direction, the subfields of the first type and second type being north pole fields and south pole fields;
wherein the main fields of the first type and the main fields of the second type are each subdivided into subfields of at least two different types;
wherein at least one of a length and an encoding strength of the subfields within a main field varies in at least the first direction; and
wherein, in the main fields of the first type, at least one of the total length in the first direction and the total surface of field portions of the first type is greater than at least one of the total length and the total surface of field portions which are not of the first type, and in the main fields of the second type, at least one of the total length in the first direction and the total surface of field portions of the second type is greater than at least one of the total length and the total surface of field portions which are not of the second type.

2. Position/displacement measuring system in accordance with claim 1, wherein the subfields of a main field comprise at least two different types from among the following: first type, second type, and third or further type.

3. Position/displacement measuring system in accordance with claim 1, wherein the at least one encoding track has an extension in the first direction and in a second direction transverse to the first direction, and wherein the sensor device is positioned spaced from the at least one scale body in a third direction which is transverse to the first direction and transverse to the second direction.

4. Position/displacement measuring system in accordance with claim 1, wherein the first direction is a measuring direction for at least one of the relative position and movement of the sensor device with respect to the at least one scale body.

5. Position/displacement measuring system in accordance with claim 1, wherein the at least one encoding track is formed as an incremental position determination region.

6. Position/displacement measuring system in accordance with claim 5, wherein at least a second encoding track is provided which is formed as an absolute position determination region.

7. Position/displacement measuring system in accordance with claim 1, wherein the variation in the subfields of the main fields is selected such that an effective sensor-biasing field pattern of the at least one encoding track is minimized in respect of harmonics and, in particular, sinusoidal in shape.

8. Position/displacement measuring system in accordance with claim 1, wherein the variation in the subfields of the main fields is periodic with the period of the arrangement of the main fields.

9. Position/displacement measuring system in accordance with claim 1, wherein the variation in the subfields of the main fields is periodically or stochastically modulated.

10. Position/displacement measuring system in accordance with claim 1, wherein the variation in the subfields is a sampling ratio variation.

11. Position/displacement measuring system in accordance with claim 10, wherein the varying sampling ratio is sinusoidal.

12. Position/displacement measuring system in accordance with claim 10, wherein the varying sampling ratio is or comprises a variation of the length in at least the first direction of subfields.

13. Position/displacement measuring system in accordance with claim 12, wherein the variation is a variation of the ratio of the length in at least the first direction of next or next-but-one neighboured subfields of different types.

14. Position/displacement measuring system in accordance with claim 10, wherein subfields of different types are arranged alternately in at least the first direction, with pairs of subfields of different types being arranged successively, and the pairs having the same length in at least the first direction, and the ratio of the lengths varying in at least the first direction for different pairs.

15. Position/displacement measuring system in accordance with claim 14, wherein the ratio of the lengths within a pair is sinusoidal.

16. Position/displacement measuring system in accordance with claim 10, wherein the varying sampling ratio is or comprises a variation of the encoding strength.

17. Position/displacement measuring system in accordance with claim 1, wherein a variation with respect to at least one of length and encoding strength of subfields is provided in a second direction transverse to the first direction.

18. Position/displacement measuring system in accordance with claim 2, wherein the subfields of the third type are magnetically neutral fields.

19. Position/displacement measuring system in accordance with claim 1, wherein the main fields of the first type and second type, integrated over their surfaces, are north pole fields and south pole fields.

* * * * *